(12) United States Patent
Li et al.

(10) Patent No.: US 7,236,175 B2
(45) Date of Patent: Jun. 26, 2007

(54) APPARATUS FOR PROJECTING COMPUTER GENERATED STEREOSCOPIC IMAGES

(75) Inventors: Po-Ying Li, Taipei (TW); Charlie H. Chang, Hsinchu (TW); San-Liang Chu, Hsinchu (TW)

(73) Assignee: National Center for High Performance Computing, Hsinchu (TW)

( * ) Notice: Subject to any disclaimer, the term of this patent is extended or adjusted under 35 U.S.C. 154(b) by 326 days.

(21) Appl. No.: 10/917,290

(22) Filed: Aug. 13, 2004

(65) Prior Publication Data

US 2006/0033742 A1    Feb. 16, 2006

(51) Int. Cl.
*G06T 15/70* (2006.01)

(52) U.S. Cl. .............................. 345/473; 345/9; 348/42; 348/51; 348/57; 348/262; 352/57

(58) Field of Classification Search ................ 345/473, 345/9; 348/51, 57, 42, 262; 352/57
See application file for complete search history.

(56) References Cited

U.S. PATENT DOCUMENTS

2002/0154214 A1* 10/2002 Scallie et al. ................. 348/51

* cited by examiner

*Primary Examiner*—Kimbinh T. Nguyen
(74) *Attorney, Agent, or Firm*—Troxell Law Office, PLLC

(57) ABSTRACT

An apparatus for projecting computer generated stereoscopic images, comprising: a computer, a dual-port video signal output device, two image projection devices, an image projection software and a stereoscopic image file, wherein the stereoscopic image file is processed and outputted to the two image projection devices through the cooperating operation of the computer, the dual-port video signal output device and the image projection software, so that a stereo image can be projected.

3 Claims, 4 Drawing Sheets

APPARATUS FOR PROJECTING COMPUTER GENERATED STEREOSCOPIC IMAGES

FIELD OF THE INVENTION

The present invention relates to an apparatus for projecting computer generated stereoscopic images, and more particularly, to an apparatus with dual-port VGA card that is capable of outputting data of stereoscopic image.

BACKGROUND OF THE INVENTION

With rapid advance of image processing technology, it has been greatly used in creating special effects for commercial movies, especially for computer animations. The movies using special effects as main attraction have become mainstream thesedays. Simultaneously, as the Disney's animations present well known fairy tale characters in visually stereoscopic images that are popular to the public, 3D movie starts to show great potential in commercial world and has attracted many interests for further investment.

Refer to FIG. 1, which is a conventional apparatus for projecting stereoscopic images. All stereoscopic imaging systems work by creating at least two images of each scene, one image of the scene as a person's left eye would see it, and the other as a person's right eye would see it. These two images are called a stereo pair. The imaging system must cause the left eye to see only the left eye image, and the right eye to see only the right eye image. In this regard, the apparatus seen in FIG. 1 has two storage media respectively for storing left eye images and right eye images, which can be VCDs, DVDs, and so on. The two storage media are respectively being played by the corresponding players, i.e. the first optic disk player 11 and the second optic disk player 12, and a synchronizing signal line 13 is used for connecting the two players so as to synchronize the output signal while playing, such that a left eye image and a right eye image both of a same image are projected through a display device 14. In addition, the display device 14 comprises a first projector 141 and a second projector 142, and each projector has a corresponding polarizing filter arranged in front of the lens thereof, i.e. the polarizers 143 and 144, by which the left eye image and the right eye image is being projected onto a stereoscopic screen 145 with the left eye image overlapping the right eye image so as to project a stereoscopic image 146. Since general optic disk players are not equipped with synchronous signal device, the apparatus seen in FIG. 1 has to adopt the much more expensive specialized optic disk players such that the stereoscopic imaging apparatus of FIG. 1 is costly and is not affordable to ordinary family.

Please refer to FIG. 2, which is another conventional apparatus for projecting stereoscopic images. The apparatus seen in FIG. 2 has two storage media that are respectively used for storing left eye images and right eye images. The storage media are respectively being assembled inside the corresponding computers, i.e. the first compute 21 and the second computer 22, and the two computers 21,22 are respectively being connected to a network 23 through cables 231 and 232, such that a left eye image and a right eye image both of a same image are projected through a display device 24. In addition, the display device 24 comprises a first projector 241 and a second projector 242, and each projector has a corresponding polarizing filter arranged in front of the lens thereof, i.e. the polarizers 243 and 244, by which the left eye image and the right eye image is being projected onto a stereoscopic screen 245 with the left eye image overlapping the right eye image so as to project a stereoscopic image 246. However, while using the apparatus of FIG. 2 to project a stereoscopic image, it requires to have the operation systems of the two computers to be activated at the time of projection so that the player program can synchronize the left image signal and the right image signal through the enabled network and cables connecting the two computers. In this regard, the apparatus of FIG. 2 also suffer the shortcoming of high cost, in addition, network is not a preferred means for transmitting synchronizing signals.

SUMMARY OF THE INVENTION

The primary object of the invention is to provide a computer apparatus for projecting stereoscopic images, which is an apparatus with dual-port VGA card or dual-port SVGA card capable of outputting processed data of stereoscopic image. Before projecting a stereoscopic image, the left eye image of the stereoscopic image is coupled with the right eye image of the same stereoscopic image horizontally, but not overlap, for forming a single image file. Thereafter, the dual-port VGA card of the apparatus of the invention receives the single image file and projects the left eye image and the right eye image to a stereoscopic screen for constructing the stereoscopic image.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
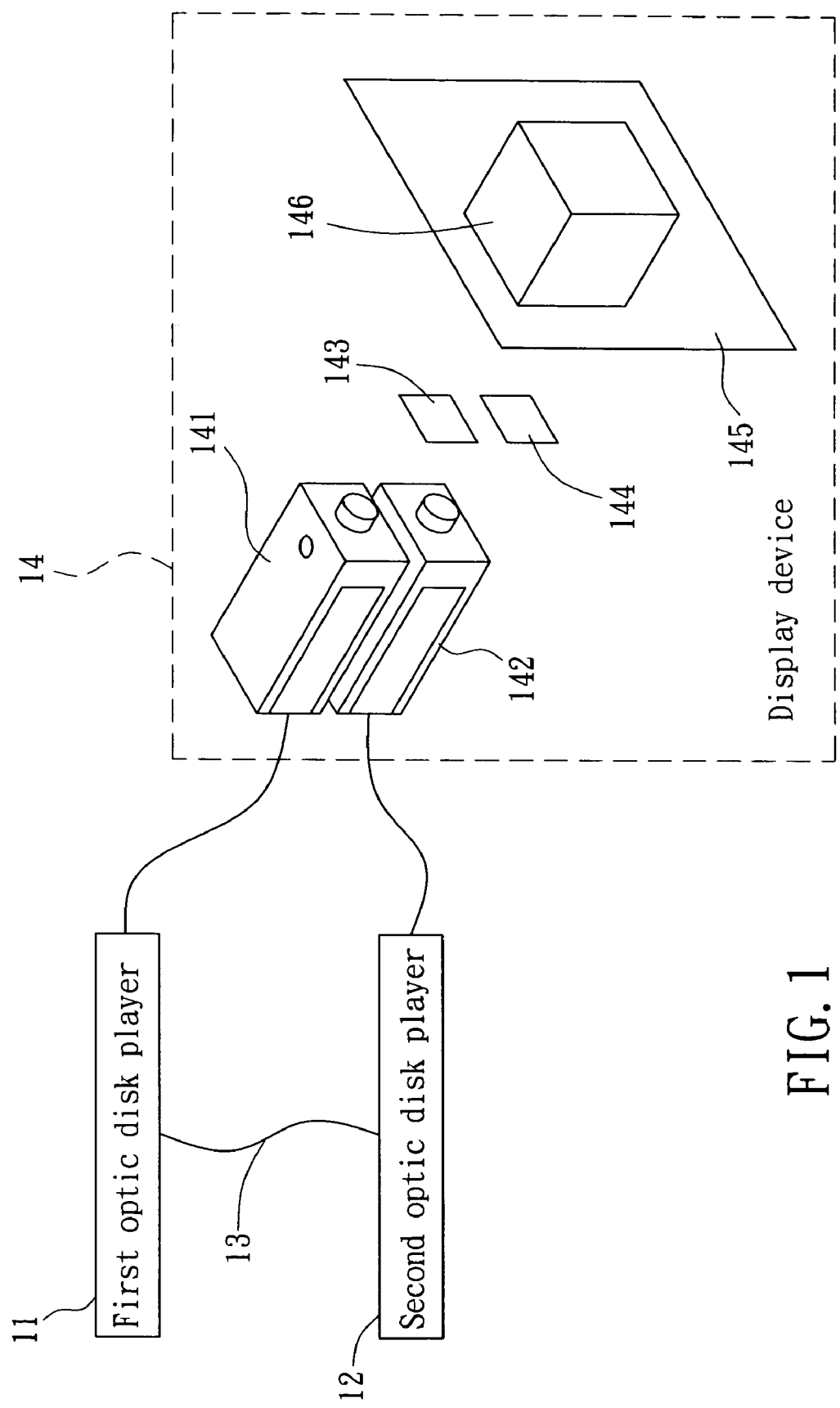
FIG. 1 is a conventional apparatus for projecting stereoscopic images.
Figure 2:
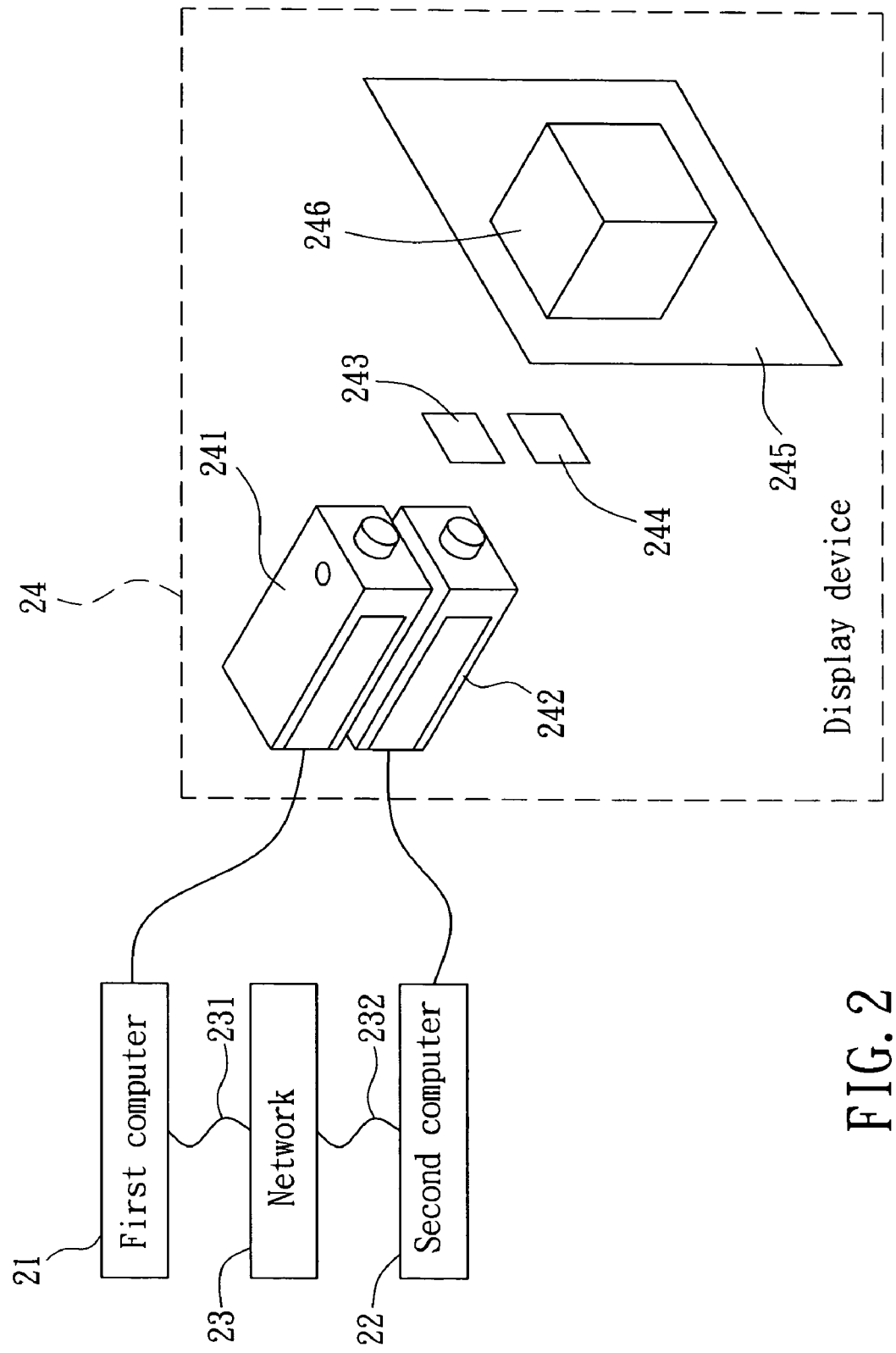
FIG. 2 is another conventional apparatus for projecting stereoscopic images.
Figure 3A:
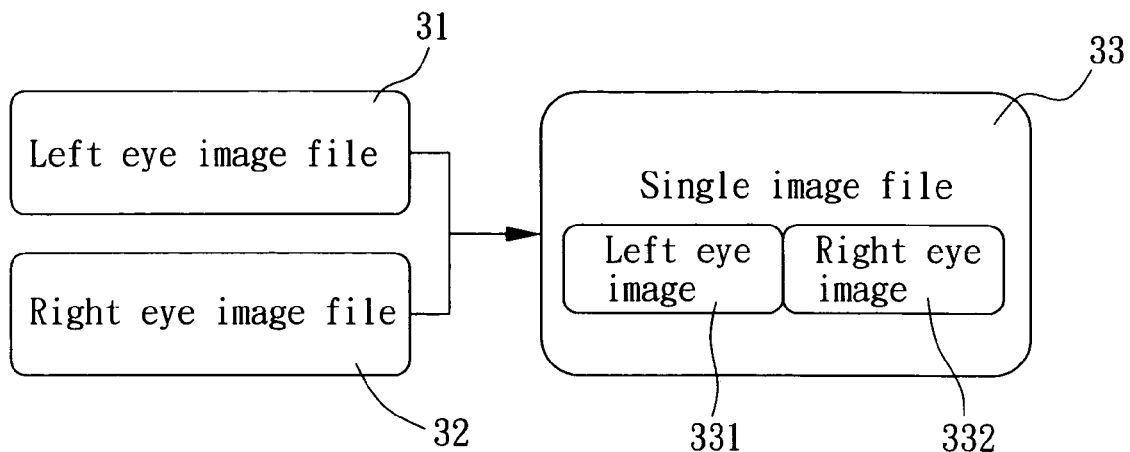
FIG. 3A and FIG. 3B are diagrams showing a processed data of stereoscopic image according to a preferred embodiment of the present invention.
Figure 3B:
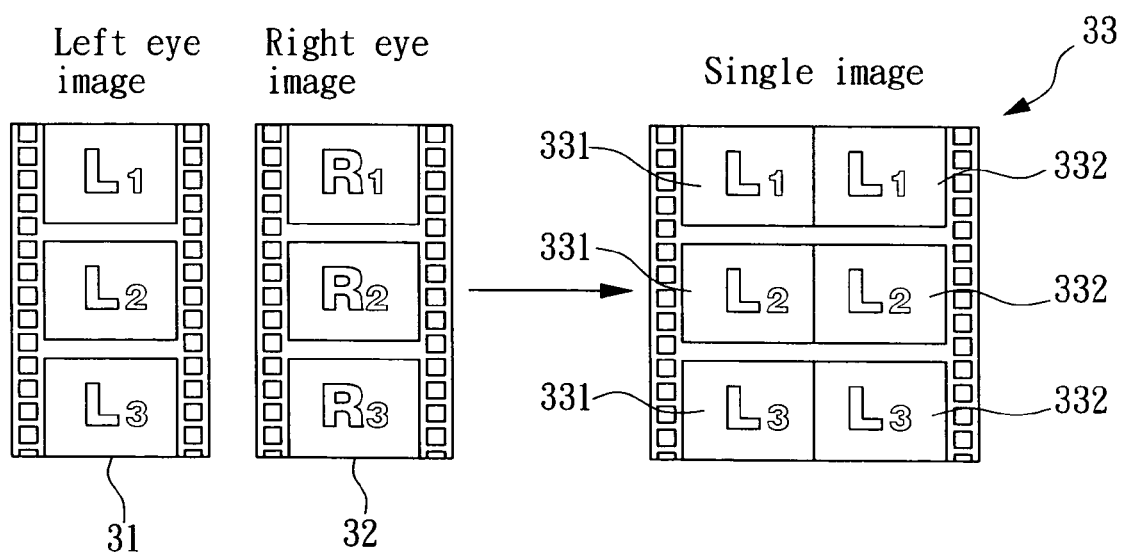

As seen in FIG. 3A and FIG. 3B, the left eye image file 31 is coupled to the right eye image file to form a single image file 33, that the single image file is constituted with the left eye image 331 and the right eye image 332, and the left eye image 331 and the right eye image 332 are acquired from the same stereoscopic image. In this regard, the width of image of the single image file 33 is twice the wide of either the image of the left eye image file 31 or the right eye image file 32, but is of the same height. Therefore, the left eye image file and the right eye image file are processed and merged as a single image file that there is no need to deal with synchronization problem in the present invention.

Figure 4:
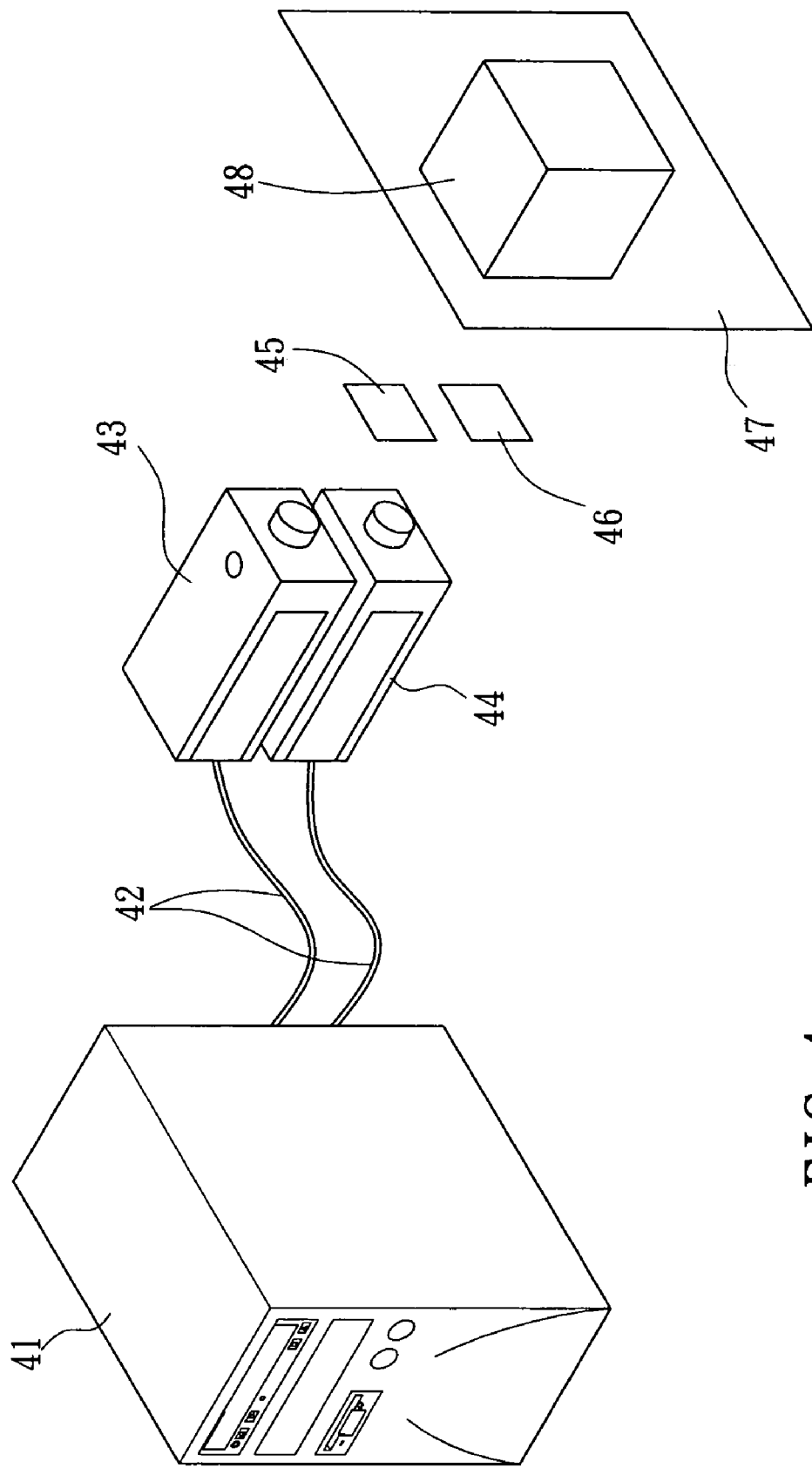
FIG. 4 is an apparatus for projecting stereoscopic images according to the present invention.

As seen in FIG. 4, the foregoing single image file is stored in the single computer 41, on which image projection software is loaded. The computer 41 further includes a single dual-port VGA card (not shown) where the image file is processed using the image projection software. Then, the resulting video signal is transmitted to the first projector 43 and the second projector 44 via a cable 42. The first projector 43 and the second projector 44 respectively has a corresponding polarizer 45 and a polarizer 46, each arranged in front of the lens thereof, such that the left eye image and the right eye image is being projected onto a screen 47 with the left eye image overlapping the right eye image so as to project a stereoscopic image 48. Advantageously, only one computer and one dual-port VGA card is used to output the image file.

To sum up, this invention has been disclosed and illustrated with reference to particular embodiments, the principles involved are susceptible for use in numerous other embodiments that will be apparent to persons skilled in the art. Consequently, the present invention has been examined to be progressive and has great potential in commercial applications.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An apparatus for projecting computer generated stereoscopic images, comprising:

a computer having an image projection software;

a single dual-port video signal output device;

two image projection devices; and a stereoscopic image file, wherein the stereoscopic image file is processed and outputted to the two image projection devices via cables connecting the single dual-port video signal output device to the two image projection devices through a cooperating operation of the computer, the dual-port video signal output device and the image projection software, wherein the stereoscopic image file is a data file of a signal image constituted by coupling a left eye image to a right eye image horizontally without overlapping to form the single image file before projection, and the left eye image and the right eye image are of a same stereoscopic image.

2. The apparatus of claim 1, wherein the image projection software is executed by the computer for projecting stereoscopic images.

3. The apparatus of claim 1, wherein the stereoscopic image file further comprising a left eye image file and a right eye image file, and the dual-port video signal output device arranged inside the computer is capable of identifying the left eye image and the right eye image and respectively transmitting the same to the corresponding one of the two image projection devices.

* * * * *